United States Patent
Koehler, Jr.

(10) Patent No.: US 7,653,065 B2
(45) Date of Patent: Jan. 26, 2010

(54) METHOD AND SYSTEM FOR INTERNET PROTOCOL ADDRESS CONCATENATION

(75) Inventor: Edwin Koehler, Jr., Ontario, NY (US)

(73) Assignee: Nortel Networks Limited, St. Laurent, Quebec (CA)

( * ) Notice: Subject to any disclaimer, the term of this patent is extended or adjusted under 35 U.S.C. 154(b) by 599 days.

(21) Appl. No.: 11/474,648

(22) Filed: Jun. 26, 2006

(65) Prior Publication Data

US 2007/0297402 A1 Dec. 27, 2007

(51) Int. Cl.
*G06F 9/34* (2006.01)
(52) U.S. Cl. .................. 370/393; 370/475; 711/209
(58) Field of Classification Search .......... 370/389, 370/392, 474–476, 393; 709/245; 711/202, 711/212, 220
See application file for complete search history.

(56) References Cited

U.S. PATENT DOCUMENTS

| | | | |
|---|---|---|---|
| 6,434,144 B1 * | 8/2002 | Romanov | 370/392 |
| 6,904,456 B2 * | 6/2005 | Cox | 709/219 |
| 2004/0264374 A1 * | 12/2004 | Yu et al. | 370/230 |
| 2005/0111494 A1 * | 5/2005 | Kecskemeti | 370/521 |

* cited by examiner

*Primary Examiner*—Pankaj Kumar
*Assistant Examiner*—Duc T Duong
(74) *Attorney, Agent, or Firm*—Christopher & Weisberg, P.A.

(57) ABSTRACT

A method and system for transmitting packets having a first address length on a core network supporting a second address length, where the second address length is larger than the first address length by determining a length of the first address and establishing an offset to the first address such that a combined length of the offset, length of a network prefix for the second address and length of the first address equals the length of the second address. The method and system of the present invention can be implemented as an enhancement to existing network protocols such as IPv4, IPv6 and the like.

18 Claims, 5 Drawing Sheets

METHOD AND SYSTEM FOR INTERNET PROTOCOL ADDRESS CONCATENATION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks, and more particularly to a method and system that provides for the use of short form addressing within an addressing architecture for network devices supporting limited address size.

BACKGROUND OF THE INVENTION

The expansion of the use of the Internet Protocol ("IP"), such as through the ever increasing growth of the Internet has put a strain on the amount of device addresses available. The popular Internet Protocol v4 ("IPv4") addressing scheme provides 32 address bits, arranged as four 8-bit segments. A more recent addressing scheme, Internet Protocol version 6 ("IPv6"), enlarges the address size to 128 bits, arranged as eight groups of four hexadecimal digits. While this increased address size allows for a vast number of addressed devices and very large networks (for instance, IPv6 supports roughly $3.4 \times 10^{38}$ addresses) most devices at the local link edge lack the resources to support the larger address size. For example, numerous radio frequency identification ("RFID") devices and various field deployable devices (referred to generally herein as "sensors") may only support an 8-bit, 16-bit or 32 bit address and therefore cannot support 128-bit IPv6 addressing. The proliferation of electronic communication devices has heightened the requirements for providing unique addresses.

While other methods of addressing for such devices are being investigated, there are no methods that incorporate the ability to route data directly based on an offset bit slice of the IPv6 address. Other methods will consequently suffer from complications in data forwarding across a standard IPv6 core network, thus requiring tunneling and/or address translation, which do not provide true end-to-end connectivity and cannot participate in some internet protocols. As such, simply writing software for execution by the general purpose CPU in forwarding devices is not practical.

What is desired is an arrangement under which existing sensor devices can be utilized to support IPv6 routing without requiring the sensors to support a full 128 bit address.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention advantageously provides a method and system for transmitting packets having a first address length on a core network supporting a second address length, where the second address length is larger than the first address length by determining a length of the first address and establishing an offset to the first address such that a combined length of the offset, length of a network prefix for the second address and length of the first address equals the length of the second address. The method and system of the present invention can be implemented as an enhancement to existing network protocol such as IPv4, IPv6 and the like.

In accordance with one aspect, the present invention provides a method for transmitting packets having a first address length on a core network supporting a second address length, where the second address length is larger than the first address length. The method for transmitting packets having a first address length on a core network supporting a second address length, where the second address length is larger than the first address length may include determining a length of the first address and establishing an offset to the first address such that a combined length of the offset, length of a network prefix for the second address and length of the first address equals the length of the second address. The method may further include matching a default router address to a unique local network address. The method may still further include removing the offset and the network prefix of the second address to provide the first address and transmitting a data packet to a destination device based on the first address.

In accordance with another aspect, the present invention provides an apparatus for transmitting packets having a first address length on a core network supporting a second address length, the second address length being larger than the first address length. The apparatus for transmitting packets having a first address length on a core network supporting a second address length, the second address length being larger than the first address length including a storage device for storing the first address and the second address, and a central processing unit which operates to determine a length of the first address and to establish an offset to the first address such that a combined length of the offset, length of a network prefix for the second address and length of the first address equals the length of the second address. The apparatus may further provide that the processor to match a default router address to a unique local network address.

In accordance with still another aspect, the present invention provides a storage medium storing a computer program which when executed by a processing unit performs a method for transmitting packets having a first address length on a core network supporting a second address length, the second address length being larger than the first address length by determining a length of the first address and establishing an offset to the first address such that a combined length of the offset, length of a network prefix for the second address and length of the first address equals the length of the second address.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
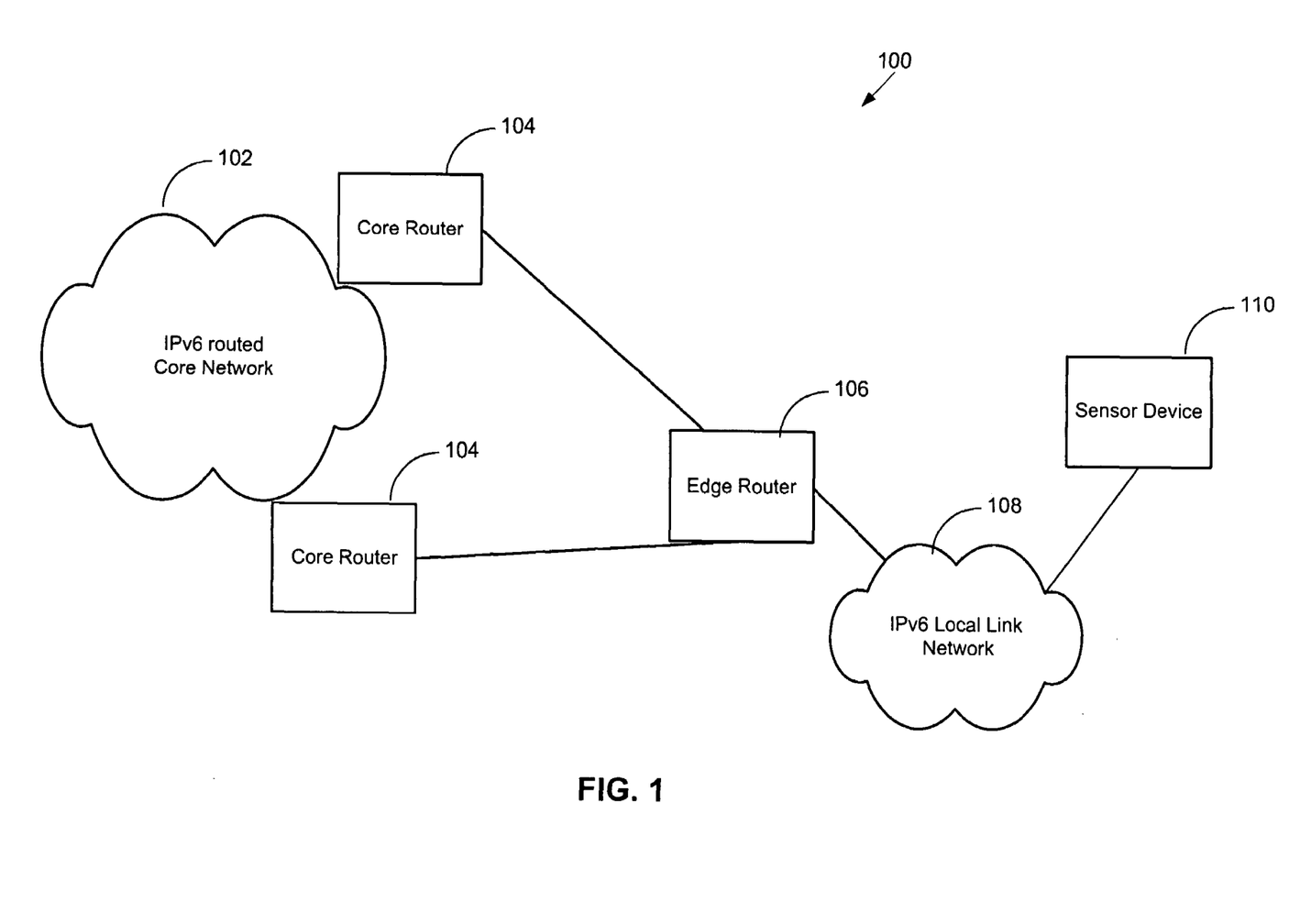
FIG. 1 is a block diagram of a communication network constructed in accordance with the principles of the present invention.

Referring now to the drawing figures in which like reference designators refer to like elements, there is shown in FIG. 1 a block diagram of a communication system constructed in accordance with the principles of the present invention and designated generally as "100". Communication system 100 preferably includes a core network 102. The core network 102 can be any network having an addressing scheme of various address length and capable of performing the functions herein. For example, an IPv6 routed core network uses a 128-bit address scheme. The core network 102 is in communication with one or more core routers 104. The core routers 104 act as junctions between the core network 102 and the local link network 108. In this exemplary embodiment, the core routers 104 communicate with an edge router 106 coupled to the local link network 108. Each of the routers 104, 106 includes a central processing unit, volatile and non-volatile storage (memory) and wired and/or wireless communication sections which can receive and/or transmit wired and/or wireless communication data to and from core network 104 and local link network 108. The local link network 108 is coupled to the IP core network 102 and allows communications to and from the IP core network 102 and other devices such as sensor devices 110. The local link network 108 can be any of the various network types, including but not limited to local area network (LAN), wireless LAN (WLAN), and the like.

The sensor devices 110 can include RFID devices and various field deployable sensors. Such devices 110 are small and typically provide only limited resources. As such, many of these devices lack the ability or capacity to use large addresses.

Address concatenation (for IPv6) allows for the use of short form ("SF") addresses by sensor devices 10 at the edge. The short form ("SF") address is a colon delimited N-bit field hexadecimal format, where N may be a bit value of any length. For address lengths below 16 bytes, the use of a single hexadecimal field is appropriate. As such, an example of an 8-bit short form hexadecimal address may appear as 'nn', while a 16-bit hexadecimal address may appear as 'nnnn' and a 32-bit hexadecimal address may appear as 'nnnn:nnnn'. All rules of leading zero reduction for IPv6 addresses can apply and thus an address of 00F0:0006 can be represented as F0:6.

The address concatenation function is provided by the edge router 106 that services the local link 108 to which a sensing device 110 is wirelessly or wiredly coupled. The basics of the process involve the appending or stripping of address fields to yield a core network length address (e.g., 128-bit for IPv6) on the core network side and a short form address of the supported length (e.g., 32-bit) on the local link side. There are two main fields that are appended to the short form address. They are the network prefix ("prefix") and the address concatenation (AC) offset. The network prefix is the scoped prefix that delineates the network portion of the (IPv6) address (with 64 bits being the maximum value). The address concatenation (AC) offset is the bit value to complete the field vacancy between the short form address and the (IPv6) network prefix. As an example, in the case of a 41-bit network prefix and a 32-bit short form address would yield an address concatenation offset value of 55 bits. Therefore, the address concatenation function results in the short form address plus the address concatenation offset plus the (IPv6) network prefix equaling a 128-bit (IPv6) address. The address concatenation function results in a 128-bit routable IPv6 address that can be handled as any other IPv6 address within the IPv6 core network 102.

Figure 2:
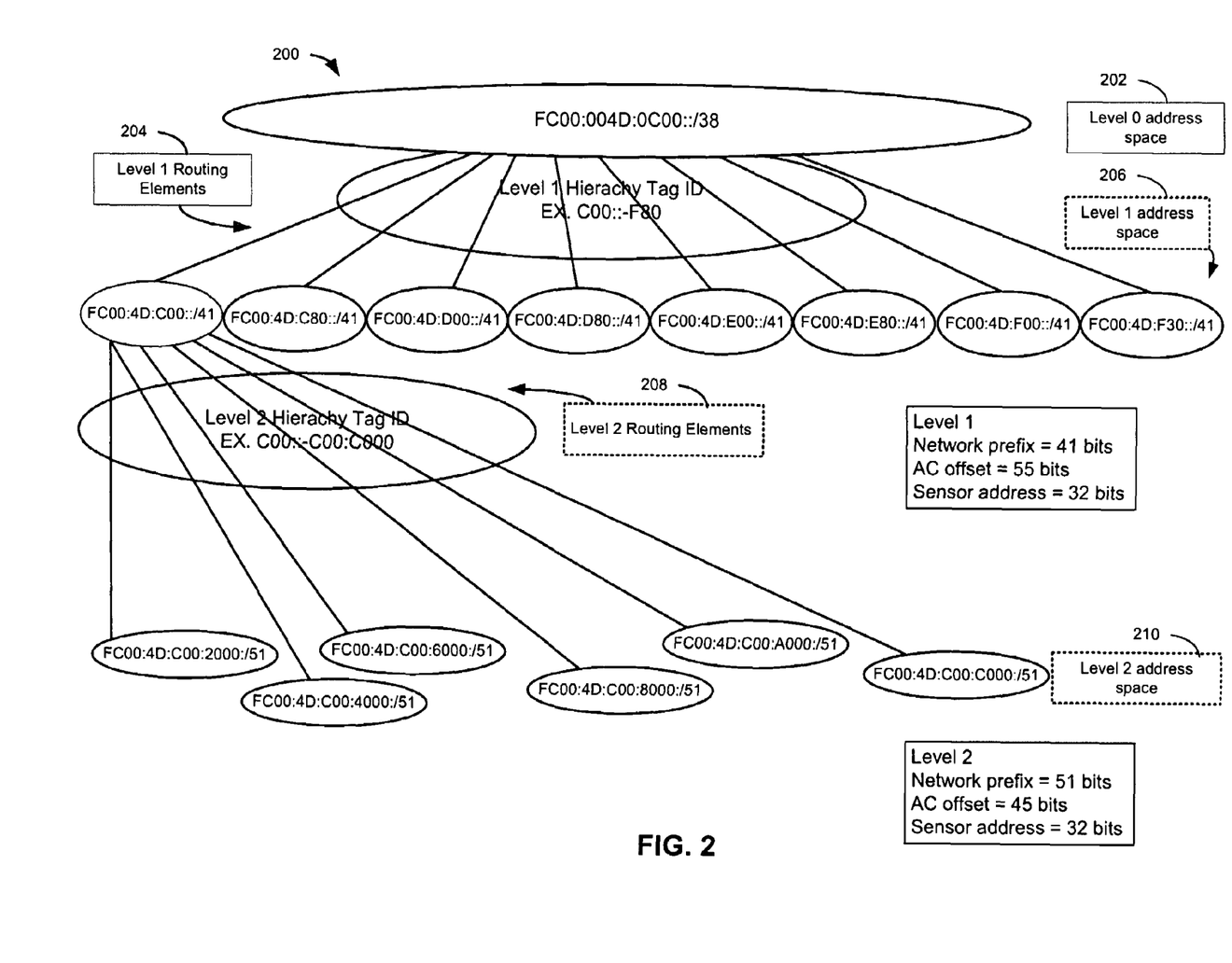
FIG. 2 is a block diagram of an exemplary address concatenation hierarchical configuration constructed in accordance with the principles of the present invention.

An exemplary hierarchical configuration for an address concatenation function (for IPv6) in accordance with the present invention is described with reference to FIG. 2. As is shown in FIG. 2, an example of the level 0 address space 202 is given as FC00:004D:0C00::/38. Accordingly, the level 1 routing elements 204 would provide level 1 hierarchy tag ID for this example, of C00::-F80, which is shown as the level 1 address space 206 of FC00:4D:C00::/41. In this case, the level 1 network prefix is equal to 41 bits and the sensor address is equal to 32 bits (here a short form address of 32 bits is assumed for ease of explanation) which means that the address concatenation offset value is 55 bits. Continuing, the level 2 routing elements would provide level 2 hierarchy tag ID of C00::-C00:C000, which is shown as the level 2 address space 210 of FC00:4D:C00:2000:/51. Thus, the level 2 network prefix is equal to 51 bits and the sensor address is equal to 32 bits which indicates that the address concatenation offset value will be 45 bits. Accordingly, the length of the address concatenation offset will vary based on the level of the device that is connected to the network as well as the length of the short form address used by the sensor devices 110.

Figure 3:
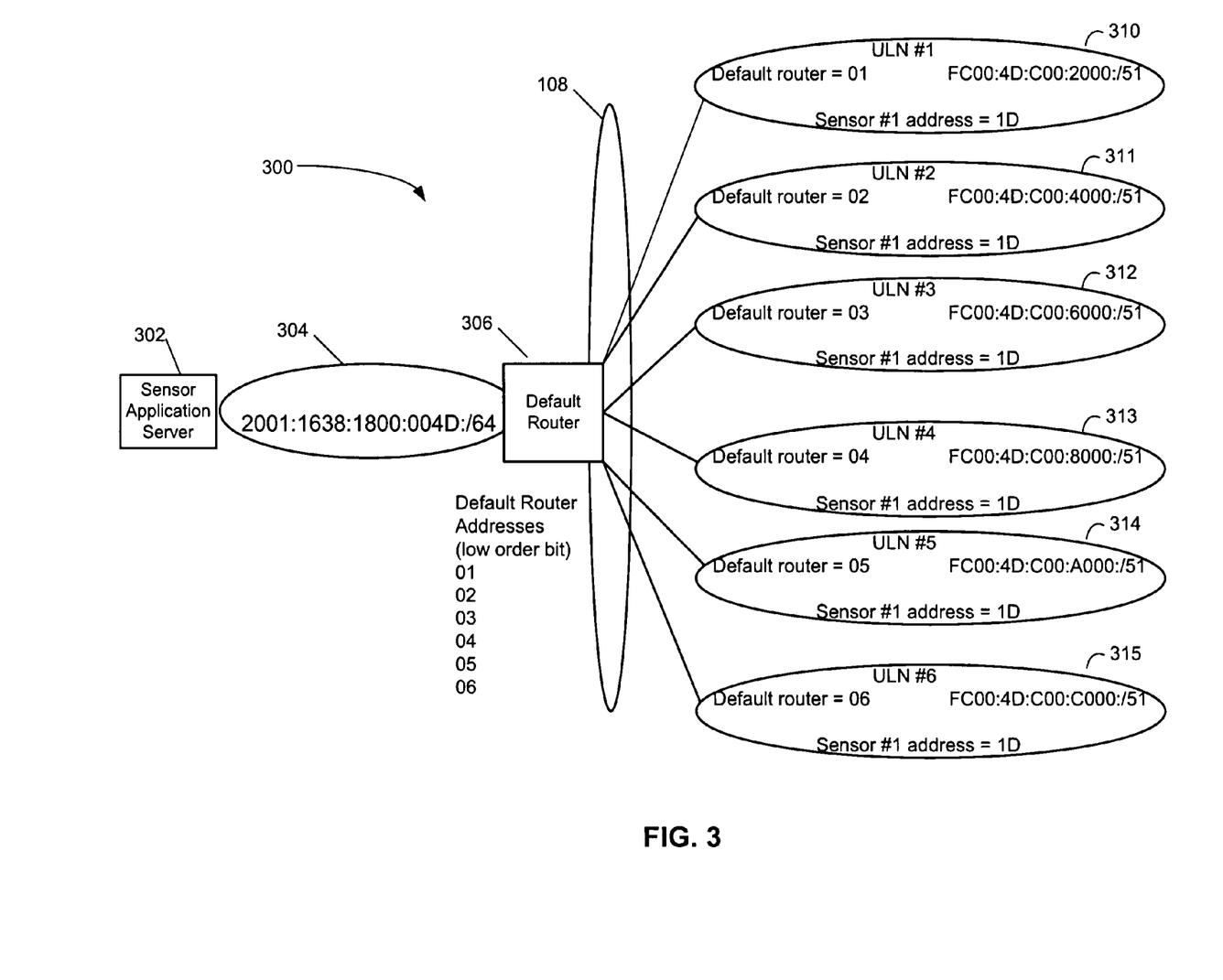
FIG. 3 is a block diagram of an exemplary sensor network constructed in accordance with the principles of the present invention.

An example of the application of the address concatenation (AC) function in accordance with the present invention is described with reference to FIG. 3. As shown in FIG. 3, a 1,500 node sensor network 300 that uses an 8-bit local address length is illustrated. In this embodiment the sensors 110 have the ability to "remember" their default router address and to send their default router address when the sensors 110 are transmitting data on the local link. For example, sensor #1 may have its short form ("SF"), default router address ("DR") equal to "01". Thus, when sensor #1 transmits its data on the local link, it will use SF DR as the destination address ("DA"), which is equal to "01". Other sensors lacking the ability to remember their default router address will use a simple broadcasting function such as sending a short form broadcast address (FF:FF) as the destination address ("DA") whenever these sensors attempt to transmit their sensor data. For an 8-bit local address length, the maximum number of unique host addresses that can be provided is 256. For the additional sensors, the addresses are replicated and unique identification is lost. In a 1,500 node sensor network 300, the replication would occur 5.85 times, or that each sensor would have approximately six other sensors with the exact same address. Thus, the ability to uniquely identify (and communicate with) any single sensor might be lost. However, this ambiguity can be removed by using (IPv6) unique local networks (ULNs), 310 through 315, that are superimposed over the same local link network 108 and represent logical subnets in IPv6 network, such that each ULN 310 through 315, has a dedicated default router 306 entry. The sensor 110 may now use the default router 306 entry, e.g., 01-06), to maintain uniqueness. As a result, each sensor 110 appears as a unique entity to the rest of the network through the combination of the 8-bit sensor address (source address) and the 8-bit default router address (destination address) given in the format of source address:destination address, (SA:DA). In the exemplary 1,500 node sensor network 300, sensor #1 and sensor #2 each have the same sensor address (source address) of 1D, however, the default router address (destination address) for sensor #1 is 01, while the default router address (destination address) for sensor #2 is 06.

Referring again to FIG. 2, the level 2 address space 210 has six addresses corresponding to the six ULNs 310-315, which means that although sensor #1 and sensor #2 have the same sensor address (0D1D) the default router addresses of '01' for network prefix FC00:4D:C00:2000 for ULN #1 and '06' for network prefix FC00:4D:C00:C000 for ULN #2 will result in globally unique addresses of:

FC00:4D:C00:2000:0C00:FC80:0A00:0D1D for sensor #1, and FC00:4D:C00:C000:0C00:FC80:0A00:0D1D for sensor #2.

Accordingly, globally unique addresses can be provided for all sensor devices 110. Thus, the enabled edge router 106 can perform the concatenation function from the local link 108 to the routed core 102 and it will also perform the reverse function of stripping off the network prefix and the AC offset and handing off any data to the sensor device 110 using the SF address and any local protocol or methodology appropriate to the sensor device 110. In addition, the edge router 106 provides addressing in the SF address format when communicating with sensor devices 110.

Figure 4:
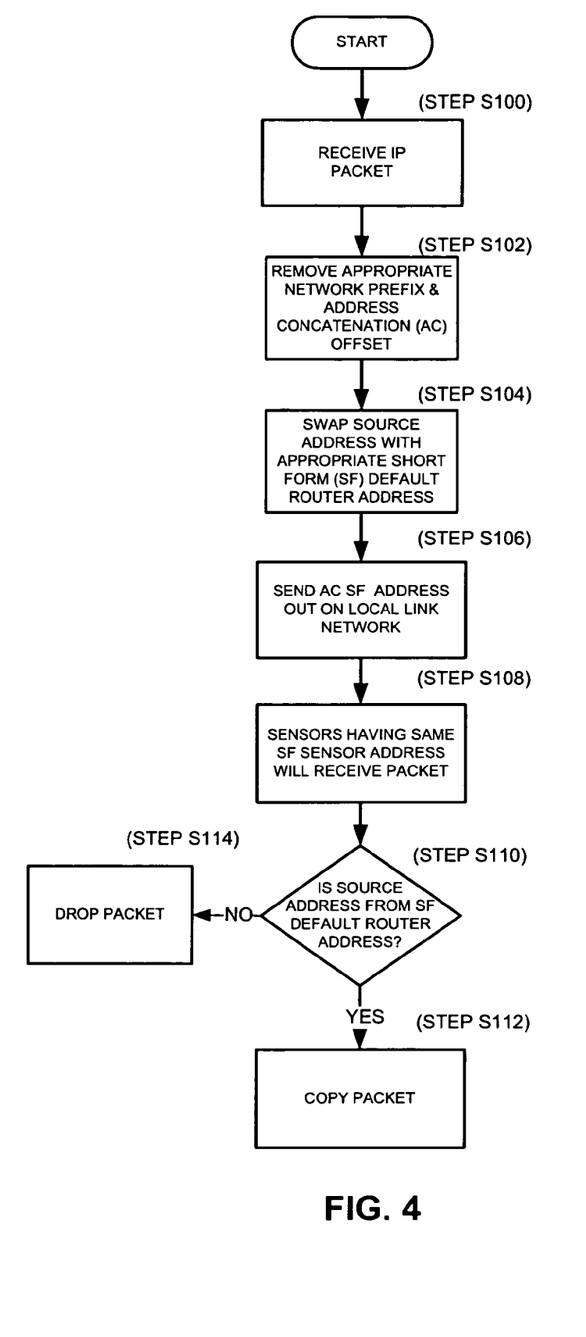
FIG. 4 is a logic flow diagram of an exemplary address concatenation receiving hierarchical configuration constructed in accordance with the principles of the present invention.

An exemplary operation of the address concatenation feature of the present invention when an IP packet is received by the edge router 106 is described with reference to the flowchart of FIG. 4. In this embodiment, the sensors 110 have the ability to "remember" their default router address and to send their default router address when the sensors 110 are transmitting data on the local link. As shown in FIG. 4, an IP packet from a core network 102 is received by the edge router 106 via step S100. At step S102, the edge router 106 processes the IP packet by stripping off the appropriate offset portion (e.g., network prefix and AC offset) and swapping the source address with the appropriate short form ("SF") default router address ("DR"), via step S104. At this point the DA is "1D", which is the sensor SF address (1D) and the source address ("SA") will be "01" which is the DR SF. Accordingly, the full IP source address ("SA") is swapped out for the default router short form address ("DR SF"). At step S106, the edge router 106 can send the address concatenation (AC) short form ("SF") address out on the local link network 108. Each of the sensors having the same sensor address (e.g., 1D) will receive the modified IP packet (step S108). At step S110, these sensor devices 110 will determine whether the modified IP packet was sent via their reserved default router address for their resident ULN, and if so that sensor device 110 will process the modified IP packet (step S112). Otherwise, the sensor devices 110 will drop or ignore the packet at step S114.

Figure 5:
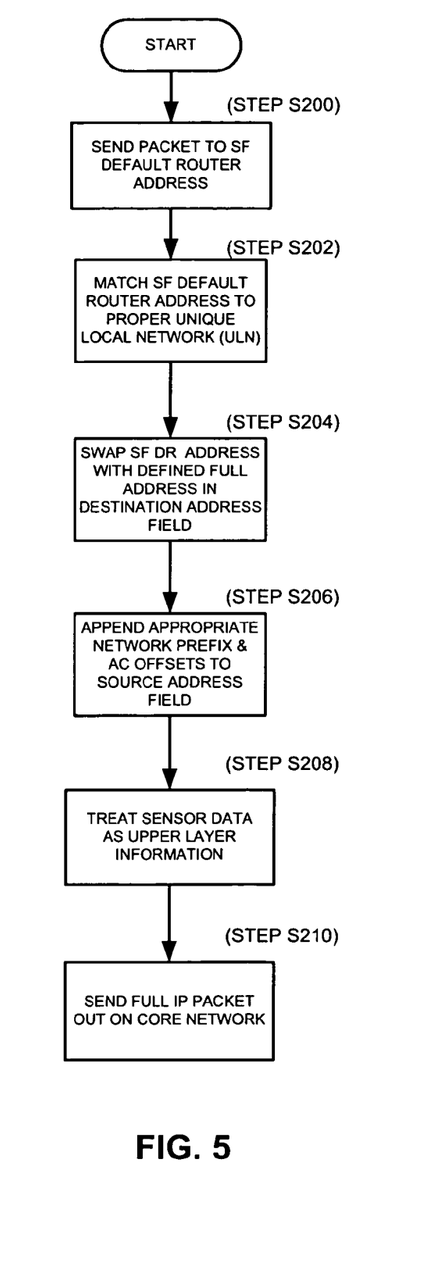
FIG. 5 is a logic flow diagram of an exemplary address concatenation sending hierarchical configuration constructed in accordance with the principles of the present invention.

Another exemplary operation of the address concatenation feature of the present invention in which a sensor device 110 sends a data packet to the edge router 106 is described with reference to the flowchart of FIG. 5. As shown in FIG. 5, a data packet from a sensor device 110 is sent to an edge router 106 via step S200. At step S202, the short form ("SF") default router address ("DR") is matched to the proper unique local network (ULN). Next the default router address ("DR") short form ("SF") destination address ("DA") is swapped out or replaced for a defined (in the router configuration and setup) full IP destination address(es) which represents the sensor application server(s) 302 to the data packet at step S204. At step S206, the source address is appended with the appropriate network prefix and AC offsets. The sensor device data is treated as upper layer information (step S208) and the modified data packet is now a fully defined IP (e.g., IPv6) data packet which can be sent out on the core network 102 (step S210).

Figure 6:
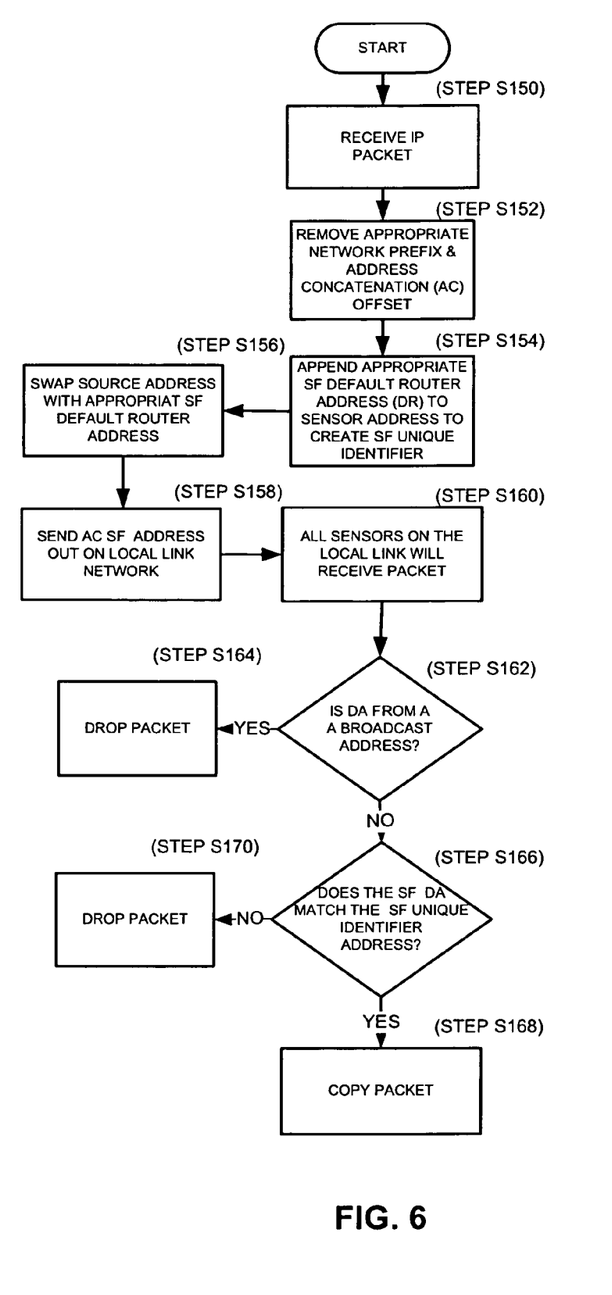
FIG. 6 is a logic flow diagram of another exemplary address concatenation receiving hierarchical configuration constructed in accordance with the principles of the present invention.

Another exemplary operation of the address concatenation feature of the present invention when an IP packet is received by the edge router 106 is described with reference to the flowchart of FIG. 6. As shown in FIG. 6, an IP packet from a core network 102 is received by the edge router 106 via step S150. At step S152, the edge router 106 processes the IP packet by stripping away the appropriate offset portion (e.g., network prefix and AC offset) and appending the appropriate short form ("SF") default router address ("DR") to the sensor address to create a unique SF identifier that is a literal combination of that sensor's own address and its default router's short form address and in the format "nn:nn", via step S154. In the example discussed with respect to FIG. 3, the two short form sensor addresses were (1D:01) and (1D:06). Accordingly at step S154, the DA will become (1D:01) which is the literal combination of the sensor #1 address of "1D", the sensor #1 default router address of "01", and represents the unique SF identifier is "1D:01". This process also illustrates that the full IP source address of 128-bits has been "swapped out" for an 8-bit default router short form address (step S156). At step S158, the edge router 106 can send the address concatenation (AC) short form ("SF") address out on the local link network 108. All sensors on the local link will receive the modified IP packet (step S160). At step S162, these sensor devices 110 will determine whether the modified IP packet destination address is a broadcast address such as (FF:FF), and if so then the sensor device 110 knows that another sensor is broadcasting and the sensor device 110 will drop or ignore the packet (step S164). Otherwise, the sensor devices 110 will determine if the destination address is from its own will short form unique identifier address (step S166) and if so, the sensor device will copy the packet, via step S168. If not, then the sensor device will drop or ignore the packet at step S170.

Figure 7:
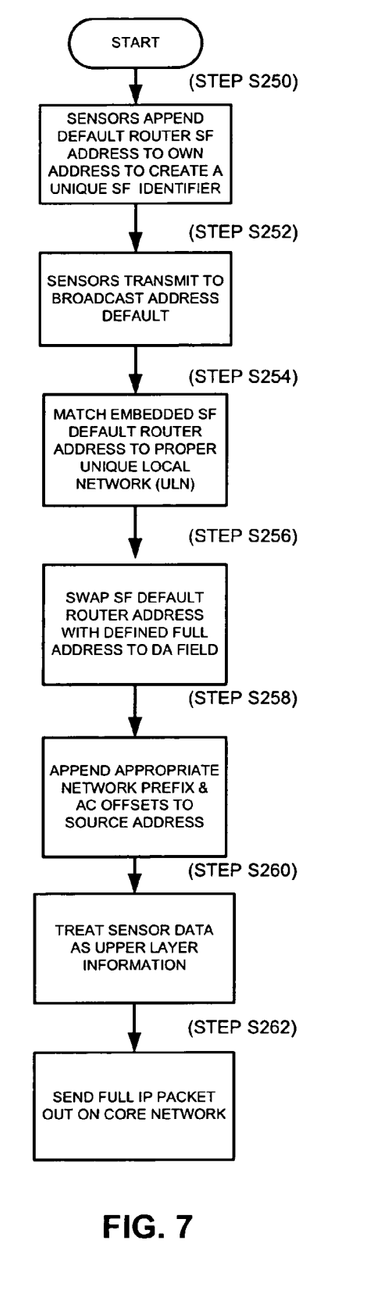
FIG. 7 is a logic flow diagram of another exemplary address concatenation sending hierarchical configuration constructed in accordance with the principles of the present invention.

Another exemplary operation of the address concatenation feature of the present invention in which a sensor device 110 sends a data packet to the edge router 106 is described with reference to the flowchart of FIG. 7. As shown in FIG. 7, the sensor devices 110 can all append their SF DRs to there own sensor device addresses to create the unique SF identifiers, via step S250. At step S252, the sensor devices 110 can transmit to a broadcast address default, e.g., (FF:FF). At step S254, the embedded short form ("SF") default router address is matched to the proper unique local network (ULN) and the SF default router address is swamped out or replaced with the defined full address of the network device (e.g., the sensor application server address) at step S256. Next the broadcast SF address (FF:FF) is swapped out or replaced for a defined full IP destination address (DA) by stripping out the embedded short form ("SF") default router address and then appending the appropriate offset portion (which may be a network prefix and an address concatenation offset) to the data packet at step S258. The sensor device data is treated as upper layer information (step S260) and the modified data packet is now a fully defined IP (e.g., IPv6) data packet which can be sent out on the core network 102 (step S262).

Although the preceding embodiments have used the IPv6 address format, it should be understood that the address concatenation (AC) function is not limited to IPv6 addresses, but instead can be used with any global addressing format to create and support a local addressing environment that is of the short form addressing format.

The use of the short form address at the sensor device level advantageously allows existing sensor devices to support the large address requirements of the IP protocols, and in particular the requirements of the IPv6 format by providing for the straightforward address concatenation methodology. The short form address can easily be appended to by the edge router servicing the local link to which the sensor device(s) are attached to provide the unique global addressing envisioned by the IPv6 protocol or any other global protocol and provides support for bi-directional control communications back to that sensor device.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein. For example, the use of domain-specific metaware for hydrologic applications (DHARMA) provides for the virtual modeling of a hierarchical routed IPv6 network in a mobile field deployment environment.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A method for transmitting packets having a first address length on a core network supporting a second address length, the second address length being larger than the first address length, the method comprising:
   receiving a data packet from a device having the first address;
   determining a length of the first address;
   establishing an offset to the first address such that a combined length of the offset, length of a network prefix for the second address and length of the first address equals the length of the second address;
   forming a revised data packet by adding the offset and the network prefix of the second address to the first address; and
   transmitting the revised data packet on the core network.

2. The method of claim 1, wherein the first address is provided by a sensor device.

3. The method of claim 1, wherein the second address is an internet protocol version 6 (IPv6) address.

4. The method of claim 1, wherein the establishing the offset to the first address includes matching a default router address to a unique local network address.

5. The method of claim 1, further comprising:
   receiving the transmitted revised data packet from the core network;
   removing the offset and the network prefix of the second address to provide the data packet having the first address; and
   transmitting the data packet to a destination device based on the first address.

6. The method of claim 1, wherein a destination address component of the first address is defined by combing a sensor short form address component and a default router short form address component.

7. An apparatus for transmitting packets having a first address length on a core network supporting a second address length, the second address length being larger than the first address length, the apparatus comprising:
   a storage device, the storage device storing the first address and the second address; and
   a central processing unit, the central processing unit operating to determine a length of the first address and to establish an offset to the first address such that a combined length of the offset, length of a network prefix for the second address and length of the first address equals the length of the second address.

8. The apparatus of claim 7, wherein the apparatus is a router.

9. The apparatus of claim 7, wherein the first address is provided by a sensor device.

10. The apparatus of claim 7, wherein the second address is an internet protocol version 6 (IPv6) address.

11. The apparatus of claim 7, wherein the processor further comprising the adding an offset to the first address to include matching a default router address to a unique local network address.

12. The apparatus of claim 7, the processor further comprising:
   removing the offset and the network prefix of the second address to provide the first address; and
   transmitting a data packet to a destination device based on the first address.

13. The apparatus of claim 7, the processor further comprising:
   receiving a data packet from a device having the first address;

forming a revised data packet by adding the offset and the network prefix of the second address to the first address; and transmitting the revised data packet on the core network.

14. A computer-readable medium having computer-readable instructions stored thereon, that upon execution by a processor, cause the processor to perform a method for transmitting packets having a first address length on a core network supporting a second address length, the second address length being larger than the first address length, the method comprising:

receiving a data packet from a device having the first address;

determining a length of the first address;

establishing an offset to the first address such that a combined length of the offset, length of a network prefix for the second address and length of the first address equals the length of the second address;

forming a revised data packet by adding the offset and the network prefix of the second address to the first address; and transmitting the revised data packet on the core network.

15. The computer-readable medium of claim 14, wherein the first address is provided by a sensor device.

16. The computer-readable medium of claim 14, wherein the second address is an internet protocol version 6 (IPv6) address.

17. The computer-readable medium of claim 14, wherein the adding an offset to the first address includes matching a default router address to a unique local network address.

18. The computer-readable medium of claim 14, wherein the method further comprises:

receiving the transmitted revised data packet from the core network;

removing the offset and the network prefix of the second address to provide the data packet having the first address; and transmitting the data packet to a destination device based on the first address.

* * * * *

UNITED STATES PATENT AND TRADEMARK OFFICE
CERTIFICATE OF CORRECTION

PATENT NO. : 7,653,065 B2  Page 1 of 1
APPLICATION NO. : 11/474648
DATED : January 26, 2010
INVENTOR(S) : Edwin Koehler, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Twenty-eighth Day of December, 2010

David J. Kappos
*Director of the United States Patent and Trademark Office*